(12) United States Patent
Heil et al.

(10) Patent No.: US 9,731,946 B2
(45) Date of Patent: Aug. 15, 2017

(54) SAFETY BRAKE FOR A LIFTING GEAR

(71) Applicant: Siemens Aktiengesellschaft, Munich (DE)

(72) Inventors: Rüdiger Heil, Goldbach (DE); Walfried Hoermann, Schoellkrippen (DE); Eugen Staub, Sommerkahl (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 14/994,583

(22) Filed: Jan. 13, 2016

(65) Prior Publication Data

US 2016/0207746 A1 Jul. 21, 2016

(30) Foreign Application Priority Data

Jan. 15, 2015 (EP) .................................... 15151312

(51) Int. Cl.
- *B66D 5/34* (2006.01)
- *F16D 48/06* (2006.01)
- *F16D 41/12* (2006.01)
- *B66D 5/24* (2006.01)

(52) U.S. Cl.
CPC ................. *B66D 5/34* (2013.01); *B66D 5/24* (2013.01); *F16D 41/12* (2013.01); *F16D 48/06* (2013.01)

(58) Field of Classification Search
CPC .. B60T 1/005; B60D 1/06; B60D 1/14; B60D 1/26; B60D 1/28; B60D 1/36; B60D 1/38; B60D 1/741; B66D 5/00; B66D 5/02; B66D 5/04; B66D 5/28; B66D 5/32; B66D 5/34; B66D 2700/03; B66D 2700/05; B66D 2700/0166; B66D 2700/0191; A62B 1/10; A62B 35/0093; E06C 9/14; E06C 1/56; F16D 41/02; F16D 41/12; F16D 41/24; F16D 59/00
USPC .............. 188/82.77, 82.7, 180; 182/74, 239; 254/285, 286
See application file for complete search history.

(56) References Cited

U.S. PATENT DOCUMENTS

| | | | | |
|---|---|---|---|---|
| 1,826,464 A | * | 10/1931 | Gillis ........................ | E05G 5/00 109/38 |
| 4,025,055 A | * | 5/1977 | Strolenberg ............. | B66D 1/52 212/308 |
| 4,437,623 A | * | 3/1984 | Wyder .................... | B60R 22/42 242/381.1 |

(Continued)

FOREIGN PATENT DOCUMENTS

| | | |
|---|---|---|
| DE | 10148408 C1 | 11/2002 |
| JP | S525144 A | 1/1977 |
| WO | WO2013008288 A1 | 1/2013 |

*Primary Examiner* — Robert A Siconolfi
*Assistant Examiner* — San Aung
(74) *Attorney, Agent, or Firm* — Cozen O'Connor

(57) ABSTRACT

A safety brake for a load lifting gear includes an actuator for a locking pawl, a brake-locking gear element connected to a lifting gear drive, pawl position monitoring sensors and a controller. The controller monitors the sensors and the lifting gear speed, and operates the lifting gear drive and the actuator to brake the lifting gear against excessive speed, by moving the actuator between energized and non-energized states and differentiating with sensor inputs among a detached state, a bearing state and a fully engaged state of the locking pawl with a pawl clearance of the brake-locking gear element.

13 Claims, 2 Drawing Sheets

(56) References Cited

U.S. PATENT DOCUMENTS 4,513,952 A * 4/1985 Vandelinde .............. B66D 1/14
182/239

* cited by examiner

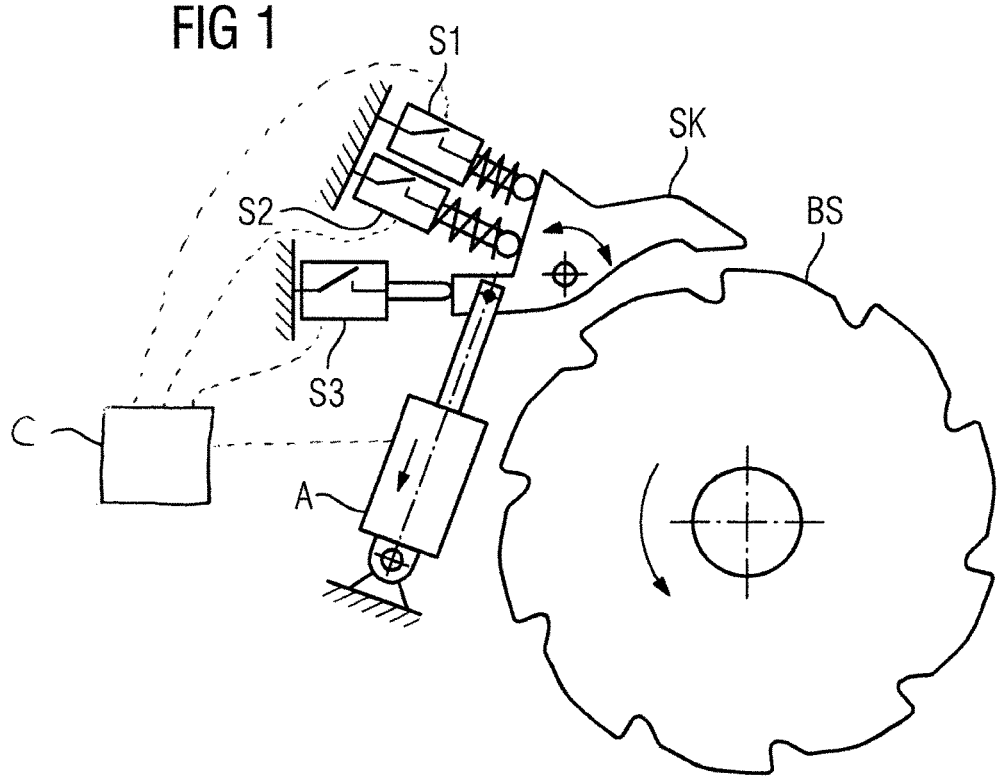
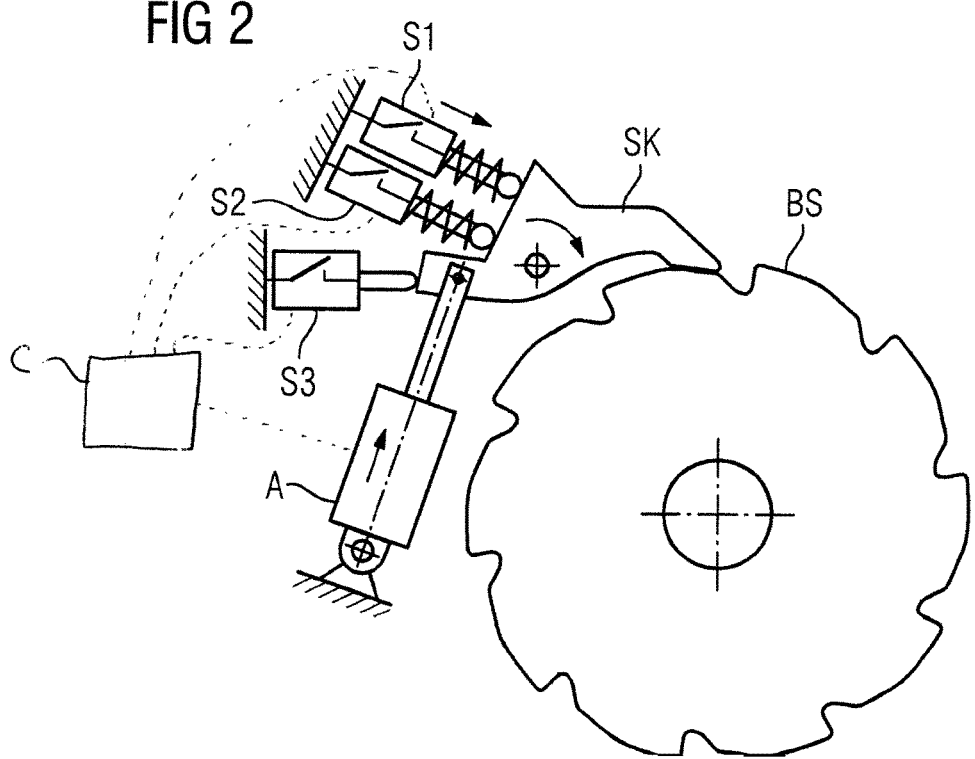

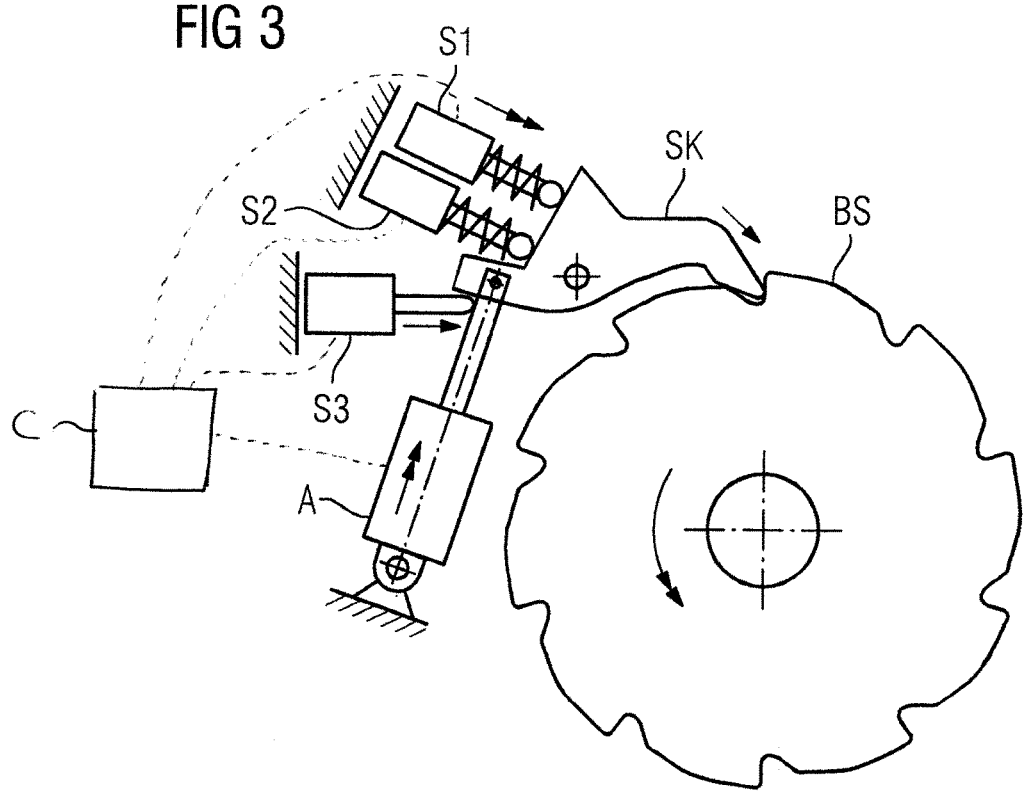

SAFETY BRAKE FOR A LIFTING GEAR

FIELD OF THE INVENTION

The invention relates to a safety brake for a lifting gear that is drivable for raising and lowering of a load, and that includes a brake-locking gear element connected to a lifting gear drive, and a locking pawl for meshed engagement with a pawl clearance of the gear element to halt continued motion of the gear element in response to excessive lowering speed of the lifting gear.

BACKGROUND OF THE INVENTION

Electrically or hydraulically driven lifting gears are often used for lifting and lowering of loads. Typically these include at least one rotating drive that, by way of a rope or other mechanical construction, such for example in the form of a scissor-type drive, accomplishes lifting or lowering of the load.

In order to provide adequate protection of people and goods, the lifting gear may be equipped with a safety brake intended to decelerate and stop the load in the event of a dangerous operating state, as in the event of an impermissibly high lowering speed of the load. Such unintentional movement of the load may for example arise as a result of an unforeseen interruption of the power supply, in the event of failure of a drive element or of an operating brake, or for other reasons.

It is essential that the safety brake, also sometimes referred to as an "interception brake", be independent of the operating brake. That is to say that the safety brake must also be able to function when the operating brake fails.

The "Safety Brake for an Electric Chain Hoist" disclosed in German Publication DE 101 48 408 C1 provides a practical arrangement in which a drive shaft of a lifting gear (in this case an electric chain hoist) is equipped with a brake ring, i.e. a friction-type deceleration mechanism. The brake ring is connected to a brake-locking gear disk which, in a safety-related deceleration, latches a locking pawl. A centrifugal-force assembly is connected to the drive to provide activation of the locking pawl. In the event of a failure of the operating brake or of an otherwise excessive lowering speed of the lifting gear, the locking pawl is caused to mesh with the brake-locking gear disk, and the lifting gear or the load of the lifting gear is thus decelerated and stopped.

This prior art arrangement exhibits the disadvantage that because triggering of the safety brake is controlled by centrifugal force, a substantial speed differential between the operationally normal lowering of the load and the actual, out-of-bounds lowering speed is required to positively distinguish between normal lowering of the load and a malfunction. A further disadvantage lies in that testing of the centrifugal-force triggering arrangement can only be performed when loading or experimental lowering of the lifting gear is carried out at very high speed. Testing of the centrifugal-force arrangement and thus of the safety brake is thus associated with high load peaks and corresponding stress on the mechanism. Moreover, current safety rules that apply to particularly critical types of such applications raise issues potentially arising in the certification of prior art safety brakes.

OBJECTS AND SUMMARY OF THE INVENTION

It is therefore an object of the present invention to provide a safety brake for a lifting gear which operates in a reliable manner, is adjustable in a precise manner, and which in function and operation may be monitored without complex and wear-prone checks.

These and other objects of the invention are achieved in an arrangement in which a lifting magnet or other electro-mechanical actuator, instead of the mechanical centrifugal-force switch known in the prior art, is employed for activating the locking pawl, in which the position of the locking pawl is monitored by at least three switches or sensors, and in which the lowering movement of the load, or of the lifting gear, is monitored by means of a safety-oriented controller and at least one sensor and a safety stop is triggered in the event of a fault. The lifting magnet or the locking pawl in the inventive arrangement is disposed such that the locking pawl by spring force and/or by gravity is caused to mesh when the actuator, e.g. the lifting magnet, is switched so as to be without power or is "non-energized". Such arrangements are also advantageously useful for lifting tables that are currently secured by so-called intervention cylinders (displacement buffers) which, however, during normal operation also incur high forces and thus losses on activation and/or limit the motion path of the lifting gear. While the locking pawl in the case of rotating drives, such as that in German Publication DE 101 48 408 C1, interacts with a conjointly rotating brake-locking gear disk as the brake-locking gear element, a rack (a brake-locking rack) may be employed for lifting tables and other linear applications as the brake-locking gear element, thus dispensing with need for conversion of linear motion to rotational motion.

In an embodiment of a safety brake for a lifting gear constructed in accordance with the present invention, a brake-locking gear element, such as a brake-locking gear disk or a brake-locking rack, is connected to a drive of the lifting gear. A locking pawl is provided for meshing with a pawl clearance of the brake-locking gear element and blocking the brake-locking gear element in the event of an impermissible (e.g. out of bounds) lowering speed of the lifting gear. The construction additionally includes an actuator for activating the locking pawl, the locking pawl and the actuator being configured and disposed so that in a non-energized state of the actuator the locking pawl bears on the brake-locking gear element or engages in the pawl clearance of the brake-locking gear element, and so that in an energized state of the actuator the locking pawl detaches from the brake-locking gear element or disengages from the pawl clearance and releases the brake-locking gear element. An electronic or numeric controller operatively controls the drive and activates the actuator; the controller monitors a lowering speed of the lifting gear and, if a permissible lowering speed is exceeded, it switches the actuator to the non-energized state. At least 3 sensors are linked to the controller for determining an operating state of the locking pawl and enabling differentiation by the controller of the operating state between at least the detached state, the bearing state, and the completely engaged in the pawl clearance state. In accordance with the advantageous functionality provided by this safety brake it is possible to accurately monitor and determine when the limit speed or boundary value for triggering of the safety brake has been exceeded. And by employing the three sensors, for example in the form of switches, the functioning and movement of the locking pawl can be monitored by means of the controller and undesirable operating states can be identified, as when the safety brake is meshed and there is attempted continuance of driving of the lifting gear to lower the load.

The present invention is additionally implemented in a method for providing a safety brake for a lifting gear, wherein a brake-locking gear element is connected to a drive shaft of the lifting gear and a locking pawl, for activation in response to an impermissible lowering speed of the lifting gear, meshes with a pawl clearance of the brake-locking gear element to block the brake-locking gear element. An actuator for activating the locking pawl is provided, wherein the locking pawl in a non-energized state of the actuator is urged against the brake-locking gear element or is engaged in the pawl clearance of the brake-locking gear element and the locking pawl in an energized state of the actuator is detached from the brake-locking gear element or is disengaged from the pawl clearance and releases the brake-locking gear element. Activating of the actuator is performed by an electronic or numeric controller that monitors a lowering speed of the lifting gear and, if a permissible lowering speed is exceeded, the actuator is set to the non-energized state. Respective operating states of the locking pawl are detected by at least 3 sensors that enable differentiation of the operating state between at least the detached state, the bearing state, and the fully engaged in the pawl clearance state. The signals of the 3 sensors and the detected speed are used by the controller for actuating the actuator and the drive.

In one preferred embodiment of the inventive construction, the actuator is an electric lifting magnet. In particular, such lifting magnets are able to release the locking pawl very rapidly once the power supply (current) has been switched off so that the locking pawl, driven by a spring force and/or gravity, can latch in a pawl clearance of the brake-locking gear element. However, the locking pawl can alternatively be kept open pneumatically or hydraulically, allowing the controller to release the movement of the locking pawl by activating a respective valve. But it is important in this context that the interlock be implemented so as to be self-securing, i.e. that its safe operating position be assumed automatically in the event of a power outage to assure that the locking pawl automatically meshes with the brake-locking gear element. Likewise, the electronic or numeric controller is advantageously implemented so as to be redundant or self-securing, so that any malfunction will always result in an emergency stop of the lifting gear. Similarly, functioning of the speed sensor for monitoring the lowering speed of the lifting gear must be implemented for redundancy and/or monitoring by a dedicated safety switch.

In an advantageous embodiment, monitoring of the lowering speed of the lifting gear or of the moving load performed by a rope encoder that provides a practical and highly reliable instrument. Alternatively, a revolution sensor or an incremental transducer or the like for detecting the lowering speed may be connected to a shaft of the drive of the lifting gear, as for example to the axle on which the brake-locking gear element acts. In such a construction, the brake-locking gear element is advantageously implemented as a gear disk (a brake-locking gear disk). In one such embodiment two completely dissimilar measuring installations—such by way of example as a rope encoder and a revolution sensor, or a radar sensor and a laser-based measuring method—for mutual checking.

The controller is advantageously implemented so that during normal operation the locking pawl bears on the brake-locking gear element only when the drive of the lifting gear is stationary. This arrangement prevents unnecessary wear on the locking pawl, wear that may for example arise if the load being lifted when detachment of the locking pawl from the brake-locking gear element would not by default be required.

Checking of the functioning of the locking pawl, and in particular of the three sensors, for detecting the respective position or the respective operating state of the locking pawl may be performed in a simple and, above all, a material-preserving manner; specifically, the actuator is switched so as to be non-electrified or non-energized, while the lifting gear or the load of the lifting gear is slowly lowered in a test operation. The locking pawl must initially bear on the brake-locking gear element and must later also engage in the brake-locking gear element. Accordingly, in a test operation all three operating states and thus all three sensors of the locking pawl must switch over when the actuator is triggered. Moreover, the motor torque can be successively increased during this test operation with the locking pawl latched and the drive thus stationary, so as to check the mechanical strength of the locking pawl and the holding torque of the brake-locking gear element. Such checks may be performed automatically in a material-preserving manner at regular intervals, such as once per day or even prior to each production use of the lifting gear.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several embodiments and figures:

FIG. 1 is a schematic depiction of a safety brake constructed in accordance with the present invention during lifting or lowering of the load at a permissible speed;

FIG. 2 is a schematic depiction of the safety brake of FIG. 1 showing the safety brake during an operational stop of the lifting gear; and FIG. 3 is a schematic depiction of the safety brake of FIGS. 1 and 2 showing the safety brake after an "intervention case" in the event of an emergency of the lifting gear.

DETAILED DESCRIPTION OF THE CURRENTLY PREFERRED EMBODIMENTS

FIGS. 1, 2, and 3 depict in each case the same arrangement of a safety brake constructed in accordance with the present invention but depicted in various operational states.

It should be noted that although the figures depict a rotating brake-locking gear element (i.e. a brake-locking gear disk), the inventive brake-locking gear element may also be implemented in an analogous manner as a rack (i.e. a brake-locking rack), in particular for lifting tables and other lifting gear arrangements that operate in a linear manner.

A brake-locking gear element BS, which is implemented as a brake-locking gear disk, and the locking pawl SK are shown in FIG. 1 as components of a lifting gear, with the locking pawl SK operatively activated by an actuator A. Sensors S1, S2, and S3, implemented in this embodiment as switches (opening switches), are activated by moving the locking pawl SK, which is pivotably mounted. The brake-locking gear disk BS is connected by way of a brake ring or other friction element (not shown) to a drive axle of a lifting gear (also not shown). The brake-locking gear disk BS and the remaining lifting gear (not shown) substantially correspond to elements of the prior art such for example as disclosed in German Publication DE 101 48 408 C1; In the herein-depicted embodiment, however, the locking pawl SK, the activation mechanism (i.e. actuator A), and the sensor system (i.e. sensors S1, S2, and S3) have been modified. also modified in relation to the prior art, or additionally present, is a sensor (not shown) for monitoring the lowering speed or the load speed of the lifting gear.

It will be assumed for purposes of this disclosure and explanation that the lowering speed of the lifting gear, or of the load, is determined by means of a revolution sensor (not shown) on the rotation axle of the brake-locking gear disk BS. With reference to the figures, the load is lowered by counter-clockwise rotation of the brake-locking gear disk BS, whereas the load is lifted by clockwise rotation of disk BS.

The sensors S1, S2, and S3 are connected to a controller C of the lifting gear and provide the controller with information pertaining to the position or positioning of the locking pawl SK. Here, each of the sensors S1, S2, S3 is assigned to one of three possible operational states (i.e. positions or positioning) of locking pawl SK. In alternative embodiments other combinations of sensors may also be used; as for example a plurality of sensors combined in one component, or by way of illustration a single "analog transducer" may also detect the pivot angle of the locking pawl SK and signal this to the controller C. However, for redundancy and for monitoring of faults, it is expedient to utilize three mutually independent sensors or switches to enable a plausibility check or monitoring of functions.

In the illustrated embodiment, the sensor S1 is wired and disposed so that it is closed when the locking pawl SK is detached from the brake-locking disk BS, i.e. so that even in the event of rotation of the brake-locking gear disk BS the locking pawl SK is not in contact with the brake-locking gear disk BS. This case is illustrated in FIG. 1; in the case of a closed switch or sensor S1, the drive of the lifting gear is released, both for lifting and for lowering of the load.

The "regular stop" of the lifting gear is illustrated in FIG. 2, the actuator A releasing the locking pawl SK. Thus, in contrast to the case depicted in FIG. 1, in which the actuator A has urged the locking pawl SK away from brake-locking gear disk BS, in FIG. 2 the locking pawl SK is by way of spring force (generated by the springs shown on the activating elements of sensors S1 and S2) pivoted toward and bears on brake-locking gear disk BS. The sensor S1 is now open, which may also be utilized for switching the drive of the lifting gear so that it is without current. The sensor S2, which here is implemented as an "opening switch", has (in contrast to the FIG. 1 case) now opened and consequently transmits information to the connected controller C that the locking pawl SK bears on brake-locking gear disk BS.

It should here again be noted here that the differentiation between the operational states of FIGS. 1 and 2 may also be accomplished by a single switch or sensor; however, mutual monitoring of the correct functioning of the sensors S1, S2, and S3, which is now possible, is not then possible. The illustrated embodiment that includes at least three sensors or switches thus increases system safety and enables fault detection.

As a consequence of the particular design of brake-locking gear disk BS, in which the pawl clearance has a tangentially-directed depression, the locking pawl SK only plunges fully into the pawl space of brake-locking gear disk BS (the "engaged state") when the locking pawl SK bears as shown in FIG. 2 and further lowering movement (counter-clockwise rotation of brake-locking gear disk BS) takes place. This final state is depicted in FIG. 3.

The state illustrated in FIG. 3 may thus only arise when lowering of the load or of the lifting gear has occurred in a non-energized state of actuator A, which is not envisaged in normal operation of the lifting gear. The state illustrated in FIG. 3 should accordingly only arise in the "intervention case", i.e. while during a lowering operation the locking pawl SK is engaged or latched. Here, relative to the FIG. 2 state, the pivotable locking pawl SK is pivoted further in the direction of the rotation axis of brake-locking gear disk BS, which is detected by activating (opening) of sensor (switch) S3. The connected controller C thus receives information that the "intervention case" has arisen, which information can be utilized for deactivating the drive ("emergency stop") or to trigger an alarm or for like responsive action.

During scheduled lifting (normal operation) of the load or of the lifting gear, the actuator A is activated in that the lifting magnet is "electrified". The locking pawl SK is thereby pivoted away from the brake-locking gear disk BS—i.e. the state illustrated in FIG. 1. The lifting drive may be switched on and the operating brake (if fitted) may be released. The same applies to scheduled lowering of the load. In the standby state ("lifting gear stationary"), both the drive as well as actuator A are without operating current. An optionally fitted operating brake is meshed. The locking pawl SK bears on the toothing of brake-locking gear disk BS (FIG. 2) but does not fully engage in a pawl clearance of brake-locking gear disk BS.

Should a failure of the operating brake now arise or the load be unintentionally lowered further for any other reason, the locking pawl SK latches completely in the next pawl clearance and thus blocks the brake-locking gear disk BS. The lifting gear or the load is thereby secured against being lowered further. The sensor S3 is activated and prevents the drive from being switched on by way of a normal operator procedure. However, in this FIG. 3 position the drive may be switched to a "lifting" operation, so as to move and release the locking pawl SK to again attain the FIG. 2 state and thereafter full or total or complete disengagement (FIG. 1) of the locking pawl SK may be effected by way of the actuator A. In an analogous manner, actuator A is also released or switched to its "without current" state in the event of a failure of the lifting gear during an ongoing operation, i.e. in the FIG. 1 disengaged state of locking pawl SK. This may be initiated for example by the controller C when a revolution or speed sensor (not shown) detects or determines that the permissible lowering speed of the load or the intended or desired lowering speed of a drive shaft of the lifting gear has been exceeded. The same applies to an outage or failure of the power supply or the like. The locking pawl SK then initially bears on the brake-locking gear disk BS (FIG. 2) and, shortly afterward, latches fully in a pawl clearance such that the brake element of brake-locking gear disk BS will decelerate and stop the axle the rope drum or the like.

Safe operation of the safety brake is provided, in particular, by deployment of the three sensors S1, S2, and S3, and the automatic spring force or weighted force activation of the locking pawl SK in the non-energized state. Depending on the required failure rating (e.g. safety rating), essential elements of this and other implementations in accordance with the invention, in particular the controller and the sensors for detecting the speed of the load, may or should be embodied to provide redundancy or permanent ("fail-safe")

monitoring. The inventive implementation herein depicted and described enables accurate adherence to the triggering speed.

Finally, the disclosed implementation provides the monitoring of correct functioning of the locking pawl SK by non-destructive test runs, wherein the lifting gear is put into a slow lowering movement and the actuator A is switched so as to be without operating current and all three narrated operating states of locking pawl SK can be detected by means of the sensors S1, S2 and S3. In the FIG. 3 operating state in which brake-locking gear disk BS is blocked in the lowering operation, the motor torque for this lowering movement may then furthermore be successively increased up to a nominal torque or until the brake element starts slipping on the brake-locking gear disk BS. The latter may be monitored using a rope encoder or a revolution transducer or the like. In this way the holding torque of the braking action can be monitored by means of the current drawn by the drive to thereby establish whether the monitored values lie within a prescribed nominal range. Both tests—i.e. both the test of the sensors S1, S2, S3 and the test of the brake installation—may be triggered manually and/or automatically at regular temporal intervals by the lifting gear. The test results are evaluated by the controller C and correspondingly visualized or documented, with the lifting gear being self-deactivating in the event of a malfunction or if plausibility issues arise.

While there have been shown and described and pointed out fundamental novel features of the invention as applied to preferred embodiments thereof, it will be understood that various omissions and substitutions and changes in the form and details of the method described and devices illustrated, and in their operation, may be made by those skilled in the art without departing from the spirit of the invention. It is the intention, therefore, to be limited only as indicated by the scope of the claims appended hereto.

What is claimed is:

1. In a safety brake for a lifting gear drivable for raising and lowering a load, the safety brake including a brake-locking gear element connected to a drive of the lifting gear, and a locking pawl for meshed engagement with a pawl clearance of the brake-locking gear element to halt continued motion of the brake-locking gear element in response to an excessive lowering speed of the lifting gear, the improvement comprising:

an actuator for activating the locking pawl, the actuator and the locking pawl being configured and disposed so that, (i) in a non-energized state of the actuator, the locking pawl one of bears on the brake-locking gear element and engages in the pawl clearance of the brake-locking gear element, and (ii) in an energized state of the actuator, the locking pawl one of detaches from the brake-locking gear element and disengages from the pawl clearance, and releases the brake-locking gear element;

at least three sensors arranged for monitoring positions of the locking pawl; and a controller, comprising one of an electronic controller and a numeric controller and connected to the at least three sensors, operable for controlling the drive of the lifting gear and for activating the actuator, wherein the controller is configured for monitoring the lowering speed of the lifting gear and, if an excessive monitored lowering speed is sensed, for switching the actuator to the non-energized state, and the controller being connected to the at least three sensors for determining an operating state of the locking pawl and differentiating between a detached operating state, a bearing operating state and a fully engaged operating state in which the locking pawl is fully engaged in the pawl clearance of the brake-locking gear element.

2. The safety brake of claim 1, wherein the actuator comprises an electric lifting magnet.

3. The safety brake of claim 1, wherein the pawl clearance of the brake-locking gear element is configured so that the locking pawl fully engages in the pawl clearance only when the lifting gear is lowered as the locking pawl bears on the brake-locking gear element.

4. The safety brake of claim 1, wherein the controller is configured for activating the drive of the lifting gear such that lowering of a load by the lifting gear during normal operation can be effected only in the energized state of the actuator.

5. The safety brake of claim 1, wherein the controller is configured so that the locking pawl can be caused to bear on the brake-locking gear element during normal operation only when the drive of the lifting gear is stationary.

6. The safety brake of claim 1, further comprising one of a rope encoder connected to the lifting gear and a revolution sensor connected to the drive of the lifting gear, for monitoring the lowering speed of the lifting gear.

7. The safety brake of claim 6, wherein the one of rope encoder and the revolution sensor is arranged for one of fail-safe and redundant operation.

8. The safety brake of claim 1, wherein the controller is one of configured and arranged for one of fail-safe and redundant operation.

9. The safety brake of claim 1, wherein the controller is configured to operate a test run for testing the at least three sensors and in which the lifting gear is lowered when the actuator is in the non-energized state, the actuator is switched to the non-energized state, and signals generated by the at least three switches are verified with the locking pawl in the bearing operating state and in the fully engaged operating state.

10. The safety brake of claim 1, wherein at least one of the at least three sensors comprises a switch.

11. A method of operating a safety brake for a lifting gear drivable for raising and lowering a load, the safety brake including a brake-locking gear element connected to a drive of the lifting gear, and a locking pawl for meshed engagement with a pawl clearance of the brake-locking gear element to halt continued motion of the brake-locking gear element in response to an excessive lowering speed of the lifting gear, the method comprising:

operating an actuator for the locking pawl in energized and non-energized states, the actuator being operated so that, (i) in the non-energized state of the actuator, the locking pawl one of bears on the brake-locking gear element and engages in the pawl clearance of the brake-locking gear element, and (ii) in the energized state of the actuator, the locking pawl one of detaches from the brake-locking gear element and disengages from the pawl clearance, and releases the brake-locking gear element; and operating a controller, comprising one of an electronic controller and a numeric controller and connected to at least three sensors arranged for monitoring positions of the locking pawl, for controlling the drive of the lifting gear and activation of the actuator, by monitoring the lowering speed of the lifting gear and, if an excessive monitored lowering speed is sensed, switching the actuator to the non-energized state, and by determining with the at least three sensors an operating state of the locking pawl to between a detached operating state, a bearing operating state and a fully engaged operating state in which the locking pawl is fully engaged in the pawl clearance of the brake-locking gear element, and using signals generated by the at least three sensors to selectively actuate the actuator and the drive.

12. The method of claim 11, wherein during normal operation a lowering movement of the drive is halted by the controller when the controller senses one of an excessive lowering speed of the lifting gear and one of the bearing operating state and the fully engaged operating state of the locking pawl.

13. The method of claim 11, wherein the controller is configured for operating a test run in which in the non-energized state of the actuator the drive of the lifting gear is switched to a load lowering operation and the actuator is witched to the non-actuated state, and in which functioning of the at least three sensors is verified with the locking pawl in the bearing operating state and in the fully engaged operating state.

* * * * *